(12) United States Patent
Strong et al.

(10) Patent No.: US 9,569,461 B2
(45) Date of Patent: Feb. 14, 2017

(54) DISTRIBUTED DATA AUTHORITY SYSTEM

(71) Applicant: The Boeing Company, Chicago, IL (US)

(72) Inventors: Robert Stephen Strong, Everett, WA (US); Max Neal Jensen, Redmond, WA (US); Anthony J. Williams, Mill Creek, WA (US); Timothy A. Denney, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 240 days.

(21) Appl. No.: 14/301,958

(22) Filed: Jun. 11, 2014

(65) Prior Publication Data
US 2015/0363424 A1    Dec. 17, 2015

(51) Int. Cl.
*G06F 17/30* (2006.01)
*H04L 29/08* (2006.01)

(52) U.S. Cl.
CPC ... *G06F 17/30215* (2013.01); *G06F 17/30581* (2013.01); *H04L 67/1095* (2013.01); *H04L 67/1097* (2013.01)

(58) Field of Classification Search
CPC ............ G06F 17/30212; G06F 17/30575; G06F 17/30215; G06F 17/3058; H04L 67/1095; H04L 67/1097
USPC ........................ 707/634, 636, 659
See application file for complete search history.

(56) References Cited

U.S. PATENT DOCUMENTS

| | | | | |
|---|---|---|---|---|
| 5,418,966 A | * | 5/1995 | Madduri | H04L 12/1813 710/200 |
| 5,884,308 A | * | 3/1999 | Foulston | G06F 17/30171 |
| 5,968,131 A | * | 10/1999 | Mendez | G06Q 10/10 707/999.201 |
| 6,253,213 B1 | * | 6/2001 | Vanderschaaf | G06F 17/30371 |
| 7,249,382 B2 | * | 7/2007 | Kawell, Jr. | G06F 21/10 380/284 |
| 7,778,975 B2 | * | 8/2010 | Tsuchiya | G06F 11/2069 707/610 |
| 8,180,730 B2 | * | 5/2012 | Thakore | G06F 17/30371 707/618 |

(Continued)

OTHER PUBLICATIONS

"Master Data and Hierarchies," SAP AG, SAP Library, copyright 2014, 3 pages, accessed Jun. 11, 2014. http://help.sap.com/saphelp_erp60_sp/helpdata/en/f5/4d723b0a4caf2fe10000000a11402f/content.htm.

*Primary Examiner* — Albert Phillips, III
*Assistant Examiner* — Alp Onat
(74) *Attorney, Agent, or Firm* — Yee & Associates, P.C.

(57) ABSTRACT

An apparatus, system, and method for distributing authority for data objects. Each of the data objects in a replication set is stored at a different data storage site and comprises a copy of a content. An edit authority is assigned to only one of the data storage sites at a time using an edit authority object corresponding to the replication set that is transferable between the data storage sites. Responsive to a change to the content of a data object located at a particular data storage site having the edit authority, an update is propagated to a remaining portion of the data storage sites to affect eventual consistency of the replication set. Usability of the data objects at the remaining portion of the data storage sites is maintained until the update is received and processed to thereby reduce a time and expense associated with maintaining data consistency.

16 Claims, 12 Drawing Sheets

(56) References Cited

U.S. PATENT DOCUMENTS

| | | | | |
|---|---|---|---|---|
| 2007/0282927 | A1* | 12/2007 | Polouetkov | G06F 17/30011 |
| 2008/0162605 | A1* | 7/2008 | Tsuchiya | G06F 11/2074 |
| 2010/0010968 | A1* | 1/2010 | Redlich | G06F 17/30672 |
| | | | | 707/E17.014 |
| 2010/0070473 | A1* | 3/2010 | Swett | G06F 17/30575 |
| | | | | 707/622 |
| 2012/0151021 | A1* | 6/2012 | Bolay | G06F 9/44505 |
| | | | | 709/221 |
| 2014/0040580 | A1* | 2/2014 | Kripalani | G06F 3/065 |
| | | | | 711/162 |
| 2014/0081864 | A1* | 3/2014 | Reese | G06Q 40/02 |
| | | | | 705/44 |
| 2014/0143545 | A1* | 5/2014 | McKeeman | H04L 63/0853 |
| | | | | 713/168 |
| 2015/0261443 | A1* | 9/2015 | Wei | G06F 3/065 |
| | | | | 711/162 |
| 2015/0278244 | A1* | 10/2015 | Shvachko | G06F 17/30174 |
| | | | | 707/634 |
| 2015/0324255 | A1* | 11/2015 | Kochunni | G06F 11/1469 |
| | | | | 711/162 |
| 2015/0356005 | A1* | 12/2015 | Hayes | G06F 12/0238 |
| | | | | 711/102 |

* cited by examiner

DISTRIBUTED DATA AUTHORITY SYSTEM

BACKGROUND INFORMATION

1. Field

The present disclosure relates generally to managing data and, in particular, to managing data that is distributed over multiple data storage sites. Still more particularly, the present disclosure relates to a method, apparatus, and system for distributing authority to manage data objects stored at multiple data storage sites to reduce a time and an expense associated with maintaining data consistency.

2. Background

Certain types of data management systems involve storing duplicate data files at different locations. Maintaining consistency among these duplicate data files using currently available methods may be more time-intensive and expensive than desired. For example, some currently available methods use a single master hierarchy to maintain data consistency and synchronize data content. With a single master hierarchy, a single master repository tracks and controls all operations that involve the creating, editing, or removing of data content across the different data files.

In one example of a single master hierarchy, a master repository at a particular location may store a master data file. Duplicates of this master data file may be stored in other secondary repositories at other locations. With a single master hierarchy, the duplicate data files must reference the master data file. The master data file and the duplicate data files share the same data content. When a user at the location of one of the secondary repositories wants to change the data content, the data content is retrieved from the master data file as a temporary data file. Changes are then made to the data content in the temporary data file and the temporary data file is submitted for approval.

If the changes are not approved, no changes are made to the master data file. If the changes are approved, the temporary data file replaces the master data file in the master repository as the new master data file. In some cases, the changes that were made to the data content are then propagated to the secondary repositories such that the same changes are made to the duplicate data files. In other cases, the new master data file is duplicated and sent to replace the old duplicate files at the secondary repositories. Other currently available methods for maintaining data consistency and synchronizing data content may include other steps in addition to or in place of the ones described above. However, these methods may also rely on the single master hierarchy.

These types of methods may be much more time-intensive and expensive than desired. In particular, some types of methods may require strong consistency. Strong consistency requires that before changes to a master data file can be made, all of the duplicates of the data file need to be synchronized. This type of synchronization may be time-intensive and expensive. Therefore, it would be desirable to have a method and apparatus that take into account at least some of the issues discussed above, as well as other possible issues.

SUMMARY

In one illustrative embodiment, an apparatus for distributing authority to manage data objects comprises a replication set, a plurality of data storage sites, and an edit authority object corresponding to the replication set. The replication set comprises a plurality of data objects. Each of the plurality of data objects comprises a copy of a content. Each of the plurality of data objects is stored at a different one of the plurality of data storage sites. The edit authority object assigns an edit authority to only one of the plurality of data storage sites at a time and is transferable between the plurality of data storage sites. A change to the content of a particular data object of the plurality of data objects at a particular data storage site in the plurality of data storage sites having the edit authority object is propagated as an update to a remaining portion of the plurality of data storage sites to affect eventual consistency of the replication set across the plurality of data storage sites. A remaining portion of the plurality of data objects at the remaining portion of the plurality of data storage sites is usable until the update is received and processed, to thereby reduce a time and an expense associated with maintaining consistency across the replication set.

In another illustrative embodiment, a distributed data authority system for storing data objects and distributing authority for managing the data objects comprises a plurality of data storage sites in a network, a replication set, and an edit authority object corresponding to the replication set. The replication set comprises a plurality of data objects stored at the plurality of data storage sites. Each of the plurality of data objects comprises a copy of a content. The edit authority object assigns an edit authority to only one of the plurality of data storage sites at a time and is transferable between the plurality of data storage sites. A change to the content of a particular data object of the plurality of data objects at a particular data storage site in the plurality of data storage sites having the edit authority object is propagated as an update to a remaining portion of the plurality of data storage sites to affect eventual consistency of the replication set across the plurality of data storage sites. A remaining portion of the plurality of data objects at the remaining portion of the plurality of data storage sites remains usable until the update is received and processed to reduce a time and an expense associated with maintaining consistency across the replication set.

In yet another illustrative embodiment, a method for distributing authority to manage data objects is provided. Each of a plurality of data objects in a replication set is stored at a different one of a plurality of data storage sites. Each of the plurality of data objects comprises a copy of a content. An edit authority is assigned to only one of the plurality of data storage sites at a time using an edit authority object corresponding to the replication set. The edit authority object is transferable between the plurality of data storage sites. In response to a change to the content of a particular data object of the plurality of data objects located at a particular data storage site having the edit authority object, an update is propagated to a remaining portion of the plurality of data storage sites to affect eventual consistency of the replication set across the plurality of data storage sites. Usability of a remaining portion of the plurality of data objects is maintained at the remaining portion of the plurality of data storage sites until the update is received and processed to thereby reduce a time and an expense associated with maintaining consistency across the replication set.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
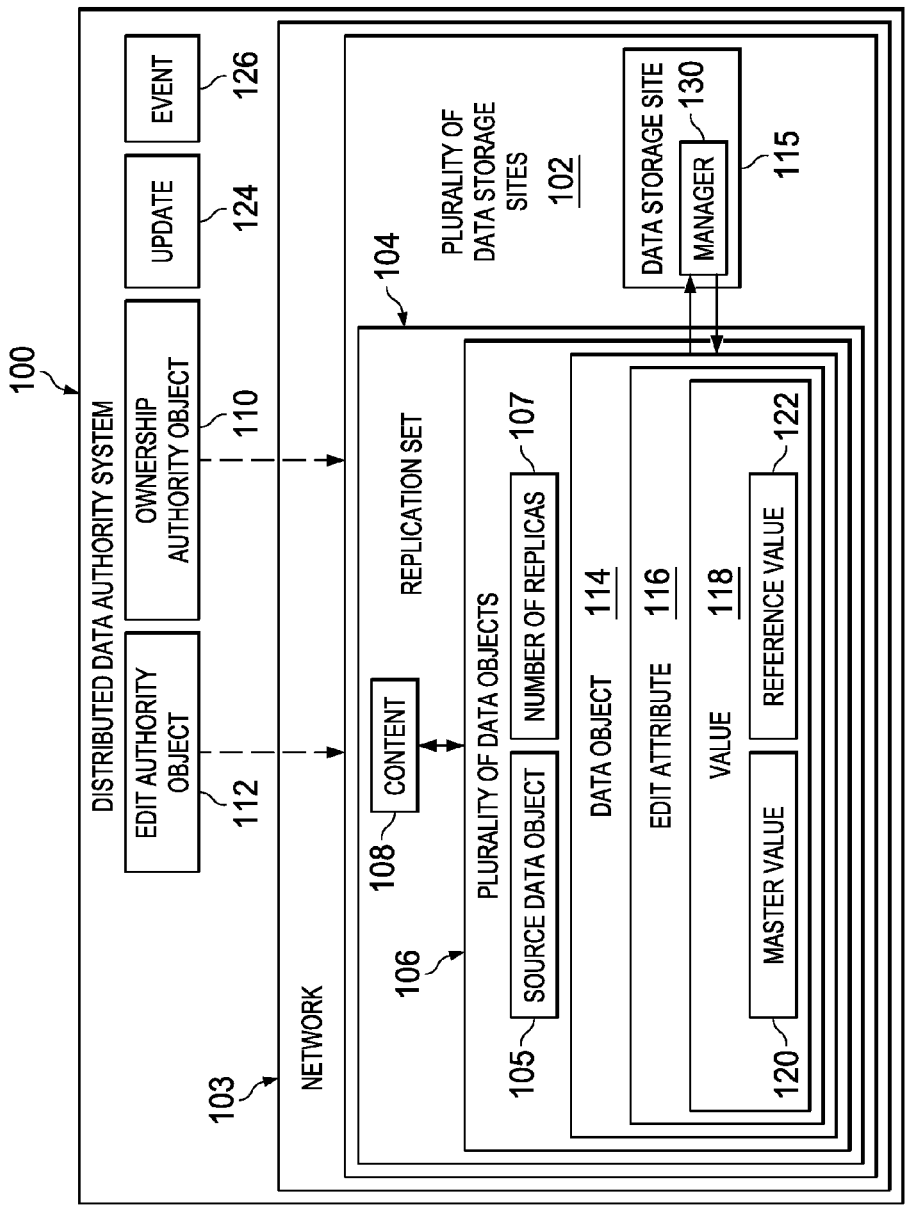
FIG. 1 is an illustration of a distributed data authority system in the form of a block diagram in accordance with an illustrative embodiment.

The illustrative embodiments recognize and take into account different considerations. For example, the illustrative embodiments recognize and take into account that it may be desirable to reduce the time and expense associated with maintaining data consistency among duplicated data files over multiple data storage sites. In particular, the illustrative embodiments recognize and take into account that allowing individual data storage sites to control their own data file without having to reference back to a master data file to make changes to the data file may reduce the time and expense associated with maintaining data consistency and synchronizing data.

Further, the illustrative embodiments recognize and take into account that instantaneous or near-instantaneous consistency may not be required in many applications. Consequently, eventual consistency may offer a better solution for these types of applications. Eventual consistency with respect to distributed data systems ensures that eventually, all duplicate data files across a distributed data system will be made consistent. The illustrative embodiments recognize and take into account that using an eventual consistency model may reduce the time and expense associated with maintaining data consistency as compared to using an instantaneous or near-instantaneous consistency model.

Thus, the illustrative embodiments provide a method and apparatus for distributing authority to manage data objects. The illustrative embodiments provide two authority objects that may be used to improve the maintaining of data consistency and data synchronization. These two authority objects are an edit authority object and an ownership authority object. The edit authority object grants permission to modify a corresponding data object. The ownership authority object maintains control of which data storage sites may be issued edit authority. Depending on the implementation, duplicate data objects may need to be fully propagated from the data storage site having the edit authority object before the data storage site having the ownership authority object can re-issue the permissions for which data storage sites can be given edit authority.

In one illustrative example, each of a plurality of data objects in a replication set is stored at a different one of a plurality of data storage sites. Each of the plurality of data objects comprises a copy of a content. An edit authority is assigned to only one of the plurality of data storage sites at a time using an edit authority object corresponding to the replication set. The edit authority object is transferable between the plurality of data storage sites. In response to a change to the content of a particular data object of the plurality of data objects located at a particular data storage site at which the edit authority object is located, an update is propagated to a remaining portion of the plurality of data storage sites to affect eventual consistency of the replication set across the plurality of data storage sites. Usability of a remaining portion of the plurality of data objects is maintained at the remaining portion of the plurality of data storage sites until the update is received and processed to thereby reduce a time and an expense associated with maintaining consistency across the replication set.

Referring now to the figures and, in particular, with reference to FIG. 1, an illustration of a distributed data authority system is depicted in the form of a block diagram in accordance with an illustrative embodiment. In this illustrative example, distributed data authority system 100 may include plurality of data storage sites 102.

Each of plurality of data storage sites 102 is a destination designated for data storage. Other operations may also be performed at plurality of data storage sites 102. For example, data may also be created, edited, deleted, modified, processed, or used in some other manner at plurality of data storage sites 102.

A data storage site in plurality of data storage sites 102 may take the form of, for example, without limitation, a computer system comprised of one or more computers in communication with each other, a server system comprised of one or more servers, a processor unit, or some other type of hardware for storing data.

Plurality of data storage sites 102 may be in different locations. For example, plurality of data storage sites 102 may be located in different buildings, on different floors of a same building, in different rooms, in different cities, in different states, in different countries, in other different locations, or some combination thereof.

In one illustrative example, plurality of data storage sites 102 may belong to network 103. Network 103 may be a communications network. For example, plurality of data storage sites 102 may be in communication with each other through any number of wired communications links, wireless communications links, optical communications links, some other type of communications link, or some combination thereof. Depending on the implementation, one or more other data storage sites in addition to plurality of data storage sites 102 may also belong to network 103. In some cases, network 103 may be a dynamic network in that one or more data storage sites may be capable of connecting to or disconnecting from network 103 at any time. In this manner, the number of data storage sites that belong to network 103 may change over time.

As depicted, replication set 104 may be stored at plurality of data storage sites 102. Replication set 104 includes plurality of data objects 106. As used herein, a "data object" may take the form of a data file or some other type of computer file or computer resource configured to store data for use by a computer application, a computer program, or a computer system.

Each of plurality of data objects 106 includes a copy of content 108. Content 108 may include text, image data, numeric data, other types of data, or some combination thereof.

In this manner, plurality of data objects 106 are duplicates of the same content 108. Plurality of data objects 106 includes source data object 105 and number of replicas 107 of source data object 105. Source data object 105 may be the original data object from which the rest of plurality of data objects 106 were duplicated. As used herein, a "number of" items may include one or more items. In this manner, number of replicas 107 may include one or more duplicates of source data object 105.

Replication set 104 may be a dynamic replication set that allows a data object to be added to the replication set, removed from the replication set, or both. Any number of these types of additions and removals may be performed over time. In this manner, the number of data objects in plurality of data objects 106 in replication set 104 may change over time.

In this illustrative example, each of plurality of data objects 106 is stored at a different one of plurality of data storage sites 102. In some illustrative examples, each of plurality of data objects 106 may be stored in a corresponding repository that is stored at one of plurality of data storage sites 102. As used herein, a "repository" may be a digital destination designated for data storage. A repository may take a number of different forms. For example, a repository may take the form of a database, a digital library, or some other type of data structure.

Data consistency may be maintained and data synchronization may be performed across replication set 104 using ownership authority object 110 and edit authority object 112. Both ownership authority object 110 and edit authority object 112 correspond to replication set 104. In other words, both ownership authority object 110 and edit authority object 112 are specific to replication set 104. Further, both ownership authority object 110 and edit authority object 112 are transferable between plurality of data storage sites 102.

Ownership authority object 110 may be created when the original data object in replication set 104 is created. In these illustrative examples, ownership authority object 110 is used to assign ownership authority to only one of plurality of data storage sites 102 at a time. In other words, the particular data storage site in plurality of data storage sites 102 that has ownership authority object 110 is the only one of plurality of data storage sites 102 that is granted ownership authority.

Ownership authority includes the permission to control which of plurality of data storage sites 102 may be given edit authority. In particular, ownership authority allows the corresponding data storage site in plurality of data storage sites 102 at which ownership authority object 110 is located to designate which of plurality of data storage sites 102 gets assigned the edit authority.

Edit authority includes permission to change or modify a data object. In these illustrative examples, edit authority object 112 is used to assign edit authority to only one of plurality of data storage sites 102 at a time. In other words, the particular data storage site in plurality of data storage sites 102 that has edit authority object 112 is the only one of plurality of data storage sites 102 that is granted edit authority.

Edit authority object 112 may be transferable between plurality of data storage sites 102 independently of ownership authority object 110. In this manner, a first data storage site in plurality of data storage sites 102 may have edit authority object 112 assigning edit authority to the first data storage site, while a second plurality of data storage sites 102 may have ownership authority object 110 assigning ownership authority to the second data storage site. In some cases, a single data storage site may have both ownership authority object 110 and edit authority object 112 at the same time.

In these illustrative examples, each data object in plurality of data objects 106 may have an attribute that has a value selected from one of a master value and a reference value. Only one of plurality of data objects 106 may have an attribute with a master value at a time.

The data object with the attribute having the master value is the data object in plurality of data objects 106 stored at the data storage in plurality of data storage sites 102 that has edit authority object 112. The data object that has the master value may be referred to as the master data object. The remaining portion of data objects in plurality of data objects 106 have the reference value for the edit attribute. These data objects having the reference value may be referred to as reference data objects.

For example, data object 114 is an example of one of plurality of data objects 106. Data object 114 is stored at data storage site 115. Data object 114 may have a set of attributes that includes edit attribute 116. As used herein, a "set of" items includes one or more items. In this manner, the set of attributes for data object 114 may include edit attribute 116 and zero or more attributes. Similarly, the set of attributes for any one of plurality of data objects 106 may include an edit attribute and zero or more attributes.

Edit attribute 116 may have value 118. When data storage site 115 possesses edit authority object 112, value 118 is equal to master value 120 in this example. Edit authority object 112 may be transferable to a different data storage site in plurality of data storage sites 102.

In correspondence with edit authority object 112 being transferred from data storage site 115 to a different data storage site, value 118 is changed from master value 120 to reference value 122. Further, the value of a different data object in plurality of data objects 106 stored at the different data storage site is changed from a reference value to the master value. In this manner, in correspondence with the edit authority object being transferred from the particular site to the different site, the value of the edit attribute of a particular data object may be changed from the master value to the reference value and the value of the edit attribute of a different data object at a different site in the plurality of sites may be changed from the reference value to the master value.

Changes may be made to content 108 of a particular data object of plurality of data objects 106 stored at a particular data storage site in plurality of data storage sites 102 when the particular data storage site possesses edit authority object 112. When a change is made, the change is propagated as an update to a remaining portion of the plurality of data storage sites to affect eventual consistency of replication set 104 across plurality of data storage sites 102.

For example, when data storage site 115 has edit authority object 112, data object 114 stored at data storage site 115 may have value 118 equal to master value 120 and may be the only one of plurality of data objects 106 having content 108 that may be changed. In response to a change being made to content 108 of data object 114, update 124 may be generated. Update 124 may be time-stamped in some illustrative examples.

Update 124 may be propagated to the remaining portion of plurality of data storage sites 102 in response to the occurrence of event 126. Event 126 may take a number of different forms. For example, without limitation, event 126 may be selected from one of a lapse of a timer, receiving a request, receiving a command, receiving input entered through an input device, or some other type of event. The input device may take the form of, for example, without limitation, a touchpad, a mouse, a keyboard, a pen, a touch screen, a microphone, or some other type of input device.

In these illustrative examples, usability of the remaining portion of plurality of data objects 106 may be maintained at the remaining portion of plurality of data storage sites 102 until update 124 is received and processed. With this type of consistency, changes made to the data object at the data storage site that has edit authority object 112 may be eventually propagated in response to the occurrence of event 126. The changes do not need to be instantaneously propagated. All data objects in plurality of data objects 106 do not need to be exactly consistent to maintain usability of plurality of data objects 106. In this manner, a time and an expense associated with maintaining consistency of replication set 104 across plurality of data storage sites 102 may be maintained.

The illustration of distributed data authority system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, the operations performed at each of plurality of data storage sites 102 may be performed by a manager. For example, managing the transfer of authority objects, such as edit authority object 112 and ownership authority object 110, to and from data storage site 115, creating new data objects, removing data objects, and other types of operations may be performed by manager 130.

In this illustrative example, manager 130 may be implemented in software, hardware, firmware, or a combination thereof. When software is used, the operations performed by manager 130 may be implemented using, for example, without limitation, program code configured to run on a processor unit. When firmware is used, the operations performed by manager 130 may be implemented using, for example, without limitation, program code and data stored in persistent memory to run on a processor unit.

When hardware is employed, the hardware may include one or more circuits that operate to perform the operations performed by manager 130. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by manager 130 may be performed using organic components integrated with inorganic components. In some cases, the operations and processes may be performed by entirely organic components, excluding a human being. As one illustrative example, circuits in organic semiconductors may be used to perform these operations and processes.

Figure 2:
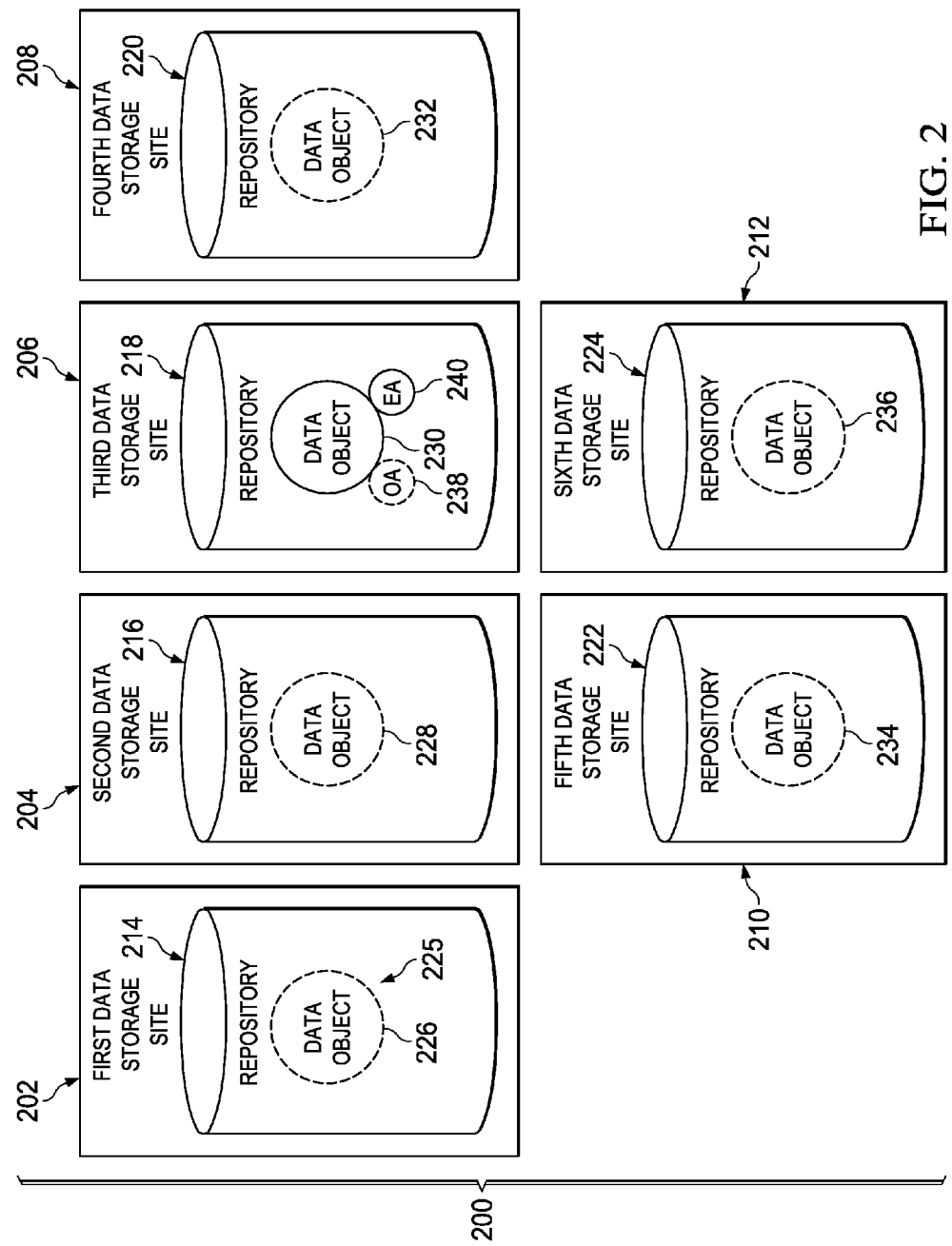
FIG. 2 is an illustration of a plurality of data storage sites in the form of a block diagram in accordance with an illustrative embodiment.

With reference now to FIG. 2, an illustration of a plurality of data storage sites is depicted in the form of a block diagram in accordance with an illustrative embodiment. In this illustrative example, plurality of data storage sites 200 is an example of one implementation for plurality of data storage sites 102 in FIG. 1.

Plurality of data storage sites 200 includes first data storage site 202, second data storage site 204, third data storage site 206, fourth data storage site 208, fifth data storage site 210, and sixth data storage site 212. As depicted, repository 214, repository 216, repository 218, repository 220, repository 222, and repository 224 are stored at first data storage site 202, second data storage site 204, third data storage site 206, fourth data storage site 208, fifth data storage site 210, and sixth data storage site 212, respectively.

Repository 214, repository 216, repository 218, repository 220, repository 222, and repository 224 store replication set 225. Replication set 225 may be an example of one implementation for replication set 104 in FIG. 1. As depicted, repository 214, repository 216, repository 218, repository 220, repository 222, and repository 224 store data object 226, data object 228, data object 230, data object 232, data object 234, and data object 236. Data object 226, data object 228, data object 230, data object 232, data object 234, and data object 236 are an example of one implementation for plurality of data objects 106 in FIG. 1.

Data object 226, data object 228, data object 230, data object 232, data object 234, and data object 236 share the same content. In this illustrative example, data object 226 may be the source data object and thus, an example of one implementation for source data object 105 in FIG. 1. Data object 228, data object 230, data object 232, data object 234, and data object 236 may be the number of replicas of the source data object and thus, an example of one implementation for number of replicas 107 in FIG. 1.

In this illustrative example, ownership authority object 238 and edit authority object 240 correspond to replication set 225. Ownership authority object 238 and edit authority object 240 are examples of ownership authority object 110 and edit authority object 112, respectively, in FIG. 1. Both edit authority object 240 and ownership authority object 238 are transferable between plurality of data storage sites 200.

Ownership authority object 238 was created when the source data object, which is data object 226, was created at first data storage site 202. In this illustrative example, ownership authority object 238 has been transferred from first data storage site 202 to third data storage site 206. Consequently, third data storage site 206 has ownership authority. In other words, third data storage site 206 has the permission to control to which of plurality of data storage sites 200 edit authority object 240 may be transferred.

Further, edit authority object 240 is located at third data storage site 206. Consequently, third data storage site 206 has edit authority. In other words, third data storage site 206 has the permission to allow changes or modifications to data object 230 stored at third data storage site 206.

In this illustrative example, each of data object 226, data object 228, data object 230, data object 232, data object 234, and data object 236 may have an edit attribute. Because third data storage site 206 has edit authority object 240, the edit attribute of data object 230 may have a master value, while the edit attributes the data objects stored at the remaining portion of plurality of data storage sites 200 may all have reference values.

When edit authority object 240 is transferred, the edit attribute of the data object stored at the data storage site to which edit authority object 240 is being transferred may be changed from the reference value to the master value. Further, the edit attribute of the data object from which edit authority object 240 is being transferred may be changed from the master value to the reference value. An example of one manner in which an edit authority object 240 may be transferred is described in FIG. 3 below.

Figure 3:
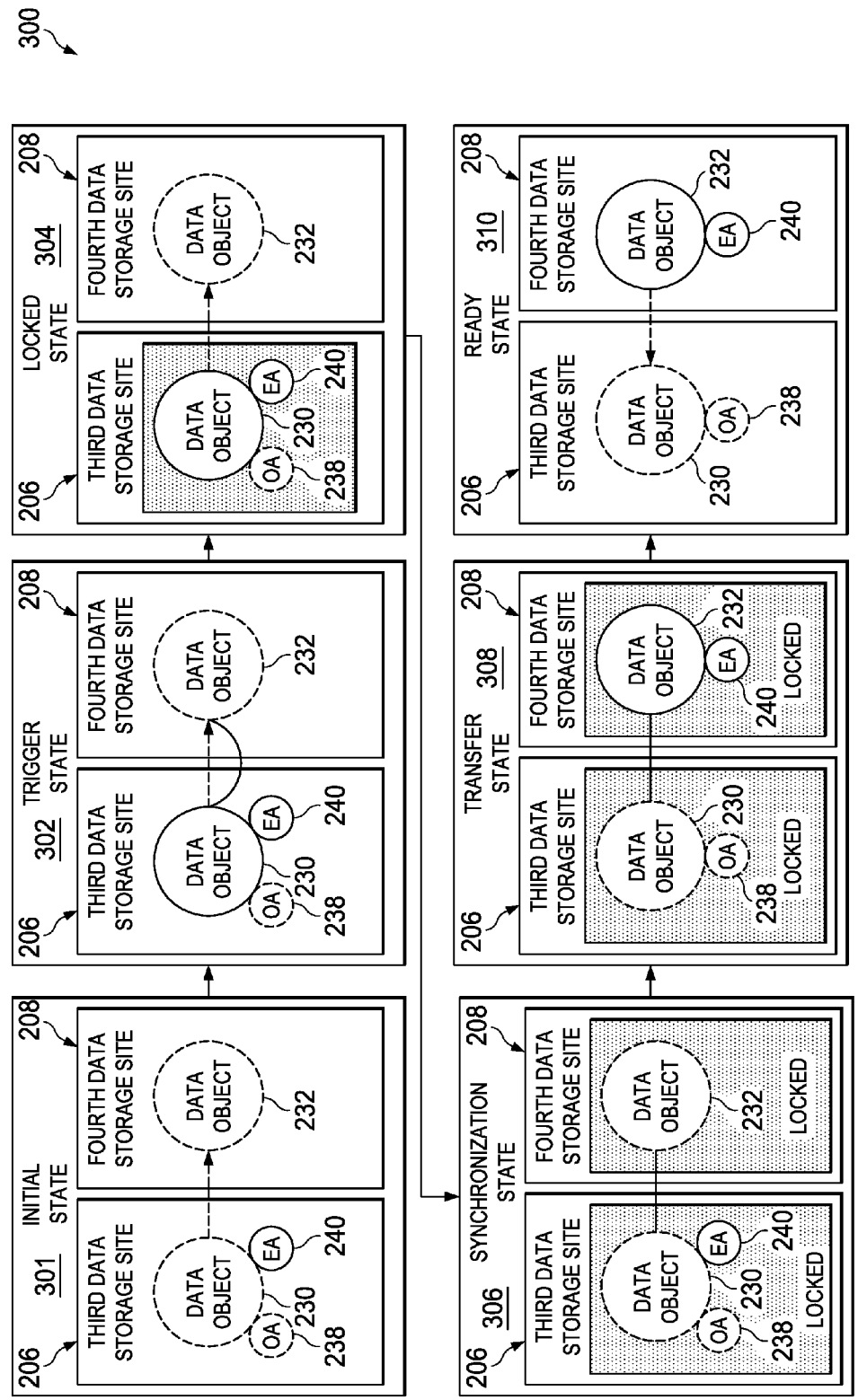
FIG. 3 is an illustration of a state diagram for the transfer of an edit authority object in accordance with an illustrative embodiment.

With reference now to FIG. 3, an illustration of a state diagram for the transfer of edit authority object 240 from third data storage site 206 to fourth data storage site 208 from FIG. 2 is depicted in accordance with an illustrative embodiment. State diagram 300 describes the process by which edit authority object 240 may be transferred from third data storage site 206 to fourth data storage site 208.

In this illustrative example, state diagram 300 includes initial state 301, trigger state 302, locked state 304, synchronization state 306, transfer state 308, and ready state 310. In initial state 301, data object 230 may be edited because third data storage site 206 has edit authority object 240. In particular, data object 230 may have an edit attribute that has a master value. However, data object 232 may not be edited because fourth data storage site 208 does not have edit authority object 240. In particular, data object 232 may have an edit attribute that has a reference value.

A transfer of edit authority object 240 may be triggered in response to any number of events to move initial state 301 to trigger state 302. As one illustrative example, fourth data storage site 208 may send a request for edit authority to third data storage site 206. Third data storage site 206 receiving this request may trigger the transfer such that initial state 301 moves to trigger state 302.

In trigger state 302, a request may be sent for approval of the transfer by the data storage site in plurality of data storage sites 200 from FIG. 2 that has ownership authority object 238. In this illustrative example, third data storage site 206 also has ownership authority object 238. Consequently, third data storage site 206 may determine whether fourth data storage site 208 is authorized to receive edit authority object 240.

In this illustrative example, third data storage site 206 approves the transfer and trigger state 302 moves to locked state 304. In locked state 304, data object 230 is locked such that no further changes may be made at third data storage site 206. Data object 232 has an edit attribute with a reference value and does not have edit authority object 240. Thus, data object 232 is considered unavailable for editing.

Next, data object 230 at third data storage site 206 and data object 232 are synchronized and validated in synchronization state 306. This synchronization and validation includes ensuring that any changes that were made to data object 230 at third data storage site 206 that have not yet been made to data object 232 are propagated as an update to fourth data storage site 208. In other illustrative examples, the synchronization and validation may include replacing data object 232 with a new copy of data object 230 to ensure that data object 232 includes the most up-to-date content.

Thereafter, edit authority object 240 is transferred from third data storage site 206 to fourth data storage site 208 in transfer state 308. During the transfer, the edit attribute for data object 232 may be changed from the reference value to the master value such that data object 232 may be editable. However, data object 232 remains locked to prevent any changes being made to data object 232 during transfer state 308. Further, the edit attribute for data object 230 may be changed from the master value to the reference value, which makes data object 230 unavailable for editing.

As depicted, edit authority object 240 may be transferred independently of ownership authority object 238. Ownership authority object 238 remains at third data storage site 206.

Once the transfer has been completed, data object 232 is unlocked for editing in ready state 310. Fourth data storage site 208 now has edit authority with respect to data object 232. In other words, changes or modifications may be made to the content of data object 232 at fourth data storage site 208.

The process used to transfer edit authority object 240 between data storage sites may also be used to transfer ownership authority object 238 between data storage sites. In other illustrative examples, an ownership authority object may not be transferable and may be required to remain with the data storage site at which the corresponding source data object was created.

Figure 4:
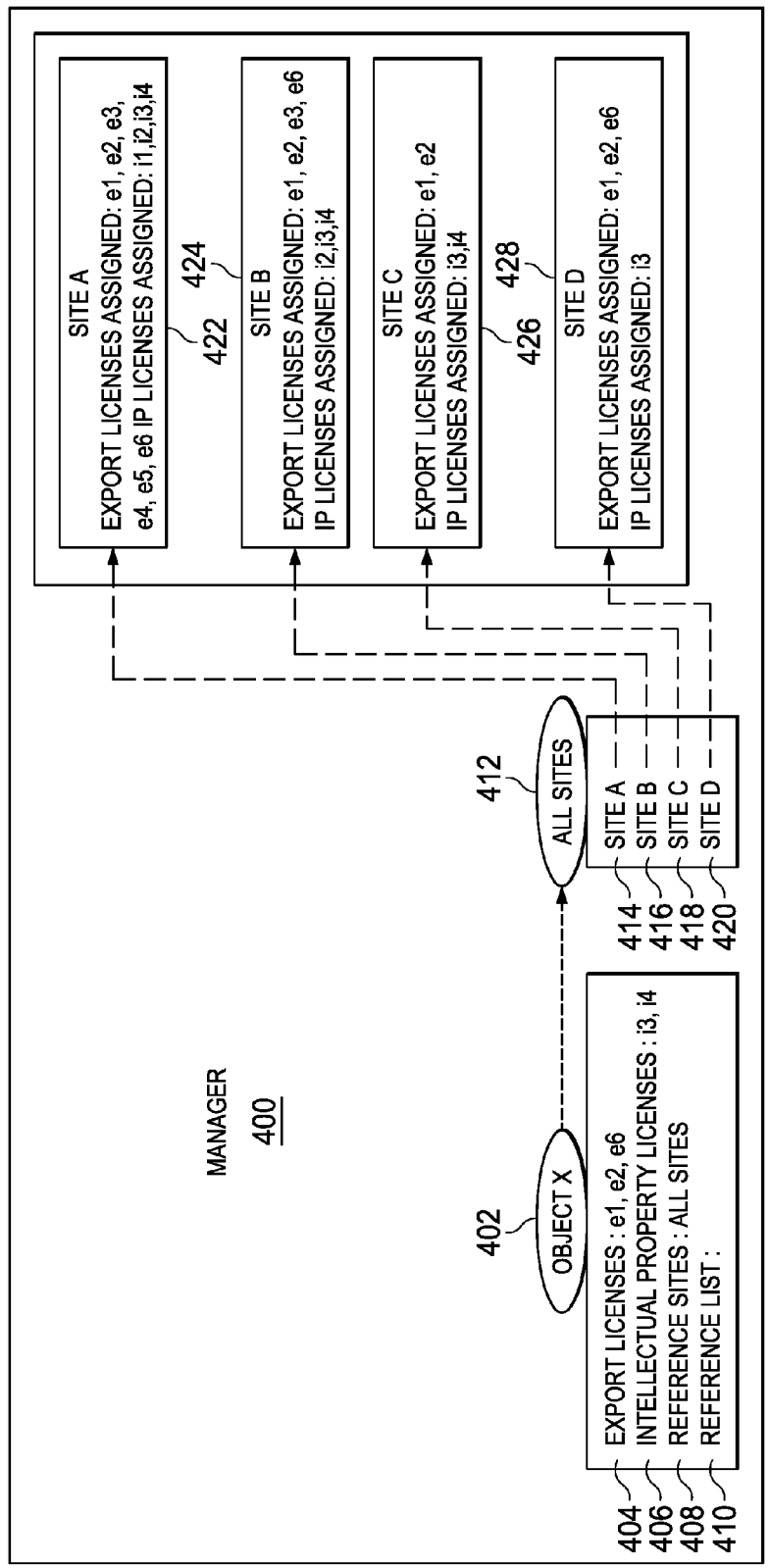
FIG. 4 is an illustration of a newly created data object in accordance with an illustrative embodiment.

With reference now to FIG. 4, an illustration of a newly created data object is depicted in accordance with an illustrative embodiment. In this illustrative example, manager 400 has created data object 402. Manager 400 may be an example of one implementation for manager 130 in FIG. 1. Data object 402 may be an example of one implementation for data object 114 in FIG. 1.

As depicted, data object 402 has a set of attributes. This set of attributes includes export licenses 404, intellectual property licenses 406, reference sites 408, and reference list 410. In other illustrative examples, the set of attributes may include other attributes in addition to, or in place of these attributes. Export licenses 404 contains a list of the different export licenses associated with data object 402. Data object 402 may only be exported to a data storage site that has the export licenses indicated in export licenses 404.

Intellectual property licenses 406 contains a list of the different intellectual property licenses associated with data object 402. Data object 402 may only be accessible to those data storage sites having the intellectual property licenses indicated by intellectual property licenses 406.

Reference sites 408 is a reference to all sites object 412. Reference list 410 is empty.

All sites object 412 is an object that references to all of the data storage sites. In particular, all sites object 412 includes site reference 414, site reference 416, site reference 418, and site reference 420, which reference data storage site A object 422, data storage site B object 424, data storage site C object 426, and data storage site D object 428, respectively.

Each of data storage site A object 422, data storage site B object 424, data storage site C object 426, and data storage site D object 428 contains a list of all of the export licenses and a list of all of the intellectual property licenses corresponding to the data storage site represented by that data storage site object.

Reference list 410 is meant to reference a list that identifies the data storage sites that meet both the export license requirements indicated by export licenses 404 and the intellectual property license requirements indicated by intellectual property licenses 406. Only those data storage sites that meet both the export license requirements and the intellectual property license requirements may be allowed to receive a duplicate of data object 402. Manager 400 may identify these data storage sites by intersecting data object 402, all sites object 412, data storage site A object 422, data storage site B object 424, data storage site C object 426, and data storage site D object 428.

Manager 400 may then compare the set of data storage sites identified based on this intersection to existing list objects. If the set of data storage sites identified match the contents of an existing list object, then manager 400 references the existing list object in reference list 410. However, if the set of data storage sites identified does not match an existing list object, manager 400 creates a new list object. An example of this new list object is described in FIG. 5 below.

Figure 5:
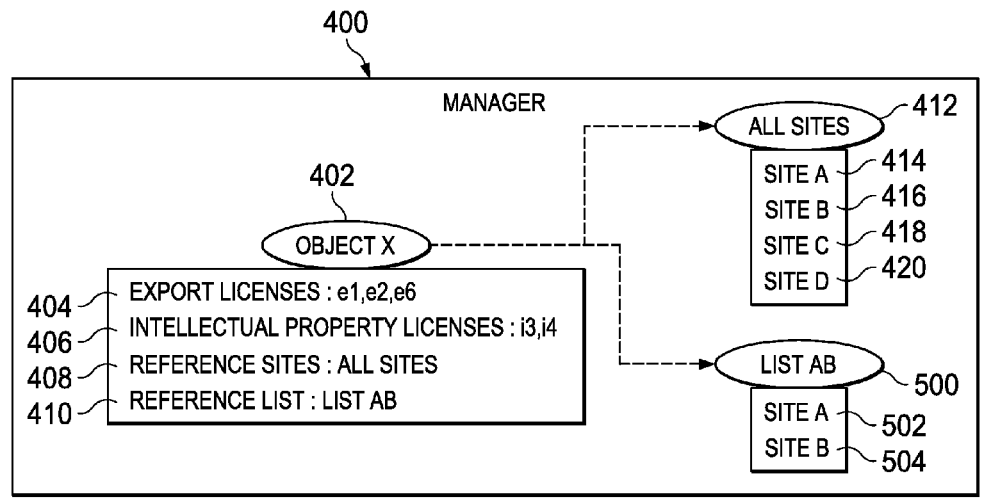
FIG. 5 is an illustration of a data object referencing an all sites object and a list object in accordance with an illustrative embodiment.

With reference now to FIG. 5, an illustration of data object 402 referencing all sites object 412 and a list object is depicted in accordance with an illustrative embodiment. Manager 400 has created list object 500. List object 500 identifies a list of the number of data storage sites authorized to have access to the content of data object 402 based on the set of attributes of data object 402.

In particular, manager 400 has created list object 500 based on the data storage sites identified by intersecting data object 402, all sites object 412, data storage site A object 422, data storage site B object 424, data storage site C object 426, and data storage site D object 428 shown in FIG. 4. List object 500 includes site reference 502 and site reference 504. Site reference 502 references data storage site A object 422. Site reference 504 references data storage site B object 424.

As depicted, reference list 410 of data object 402 has been updated to reference list object 500. List object 500 allows a faster reference to the particular data storage sites that may be allowed to receive duplicates of data object 402.

Once list object 500 has been created, list object 500 may be referenced by other newly created data objects. An example of another data object referencing list object 500 is described in FIG. 6 below.

Figure 6:
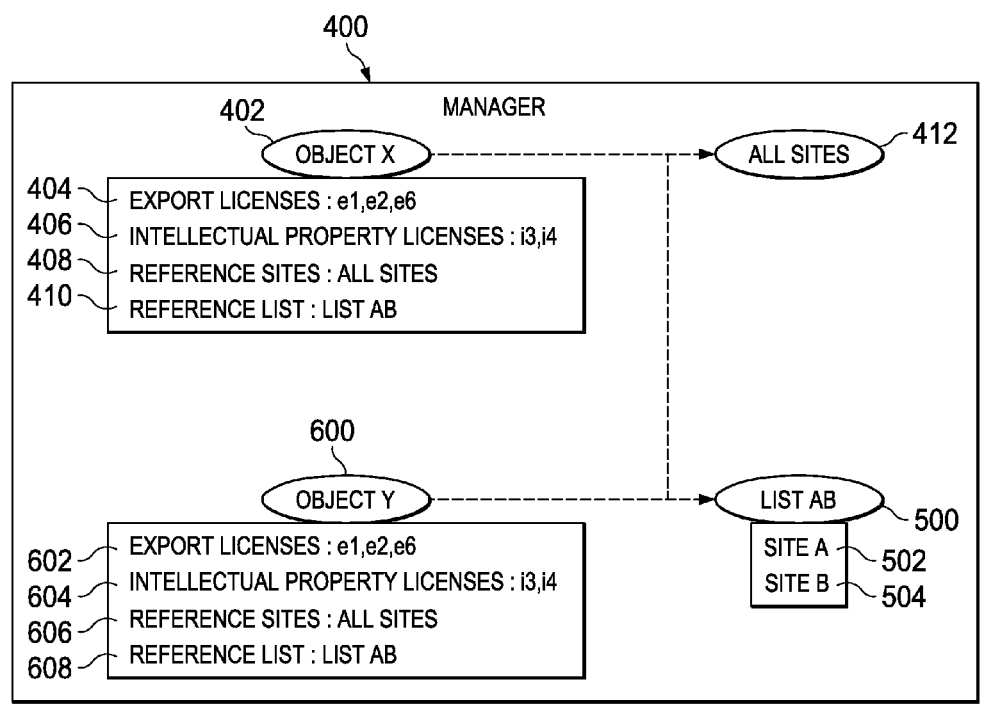
FIG. 6 is an illustration of another data object referencing a list object in accordance with an illustrative embodiment.

With reference now to FIG. 6, an illustration of another data object referencing list object 500 is depicted in accordance with an illustrative embodiment. Manager 400 has created data object 600. Data object 600 has a set of attributes. This set of attributes includes export licenses 602, intellectual property licenses 604, reference sites 606, and reference list 608. Because export licenses 602, intellectual property licenses 604, and reference sites 606 are the same as export licenses 404, intellectual property licenses 406, and reference sites 408, manager 400 may reference list object 500 in reference list 410.

In particular, intersecting data object 600 and all sites object 412 with data storage site A object 422, data storage site B object 424, data storage site C object 426, and data storage site D object 428 from FIG. 4 results in the identification of data storage sites identified in an existing list object, list object 500. Thus, manager 400 can use list object 500 and does not need to create a new list object.

In FIGS. 4-6, each of data object 402, all sites object 412, data storage site A object 422, data storage site B object 424, data storage site C object 426, data storage site D object 428, and data object 600 may be used to form replication sets that have a corresponding edit authority object and a corresponding ownership authority object.

The illustrations of plurality of data storage sites 200 in FIG. 2, state diagram 300 in FIG. 3, and manager 400 in FIGS. 4-6 are not meant to imply logical or architectural limitations to the manner in which an illustrative embodiment may be implemented. For example, other objects and attributes in addition to or in place of the ones illustrated may be used. Some attributes may be optional.

Figure 7:
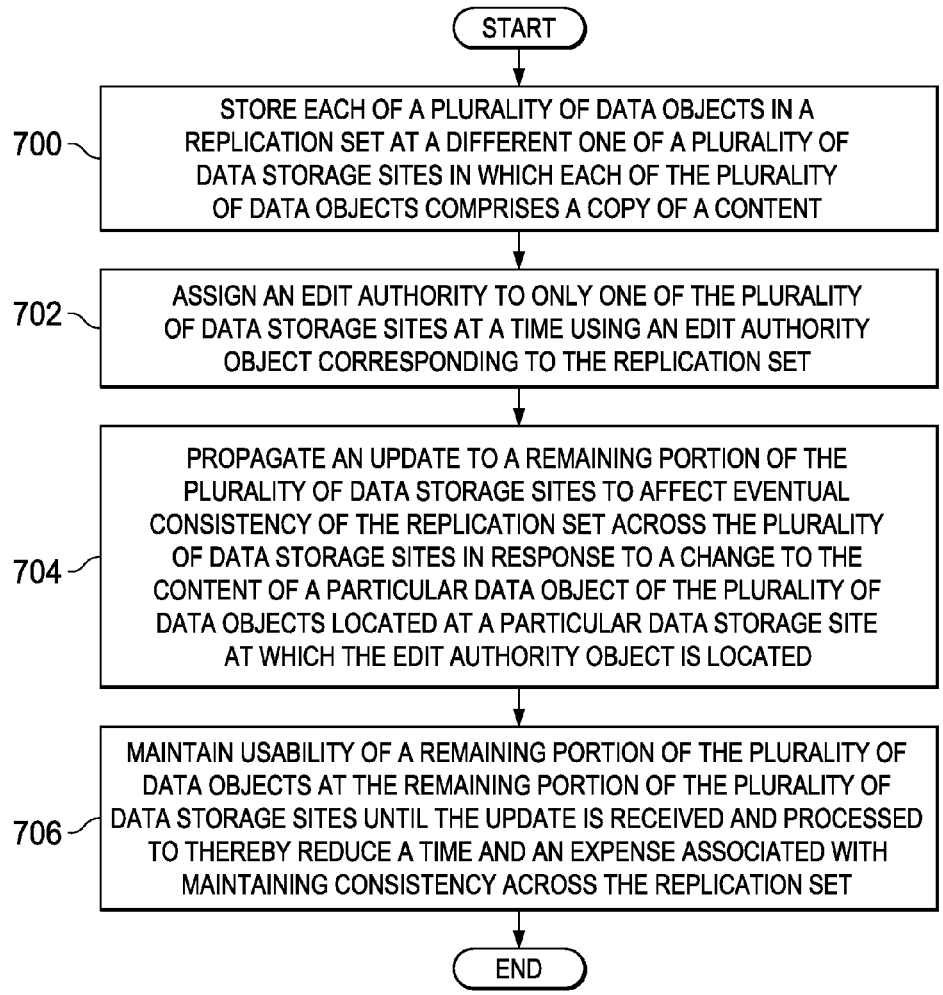
FIG. 7 is an illustration of a process for distributing authority to manage data objects in the form of a flowchart in accordance with an illustrative embodiment.

With reference now to FIG. 7, an illustration of a process for distributing authority to manage data objects is depicted in the form of a flowchart in accordance with an illustrative embodiment. The process illustrated in FIG. 7 may be performed using distributed data authority system 100 in FIG. 1.

The process begins by storing each of a plurality of data objects in a replication set at a different one of a plurality of data storage sites in which each of the plurality of data objects comprises a copy of a content (operation 700). An edit authority is assigned to only one of the plurality of data storage sites at a time using an edit authority object corresponding to the replication set (operation 702). The edit authority object is transferable between the plurality of data storage sites.

Thereafter, an update is propagated to a remaining portion of the plurality of data storage sites to affect eventual consistency of the replication set across the plurality of data storage sites in response to a change to the content of a particular data object of the plurality of data objects located at a particular data storage site at which the edit authority object is located (operation 704). Usability of a remaining portion of the plurality of data objects is maintained at the remaining portion of the plurality of data storage sites until the update is received and processed to thereby reduce a time and an expense associated with maintaining consistency across the replication set (operation 706), with the process terminating thereafter.

Figure 8:
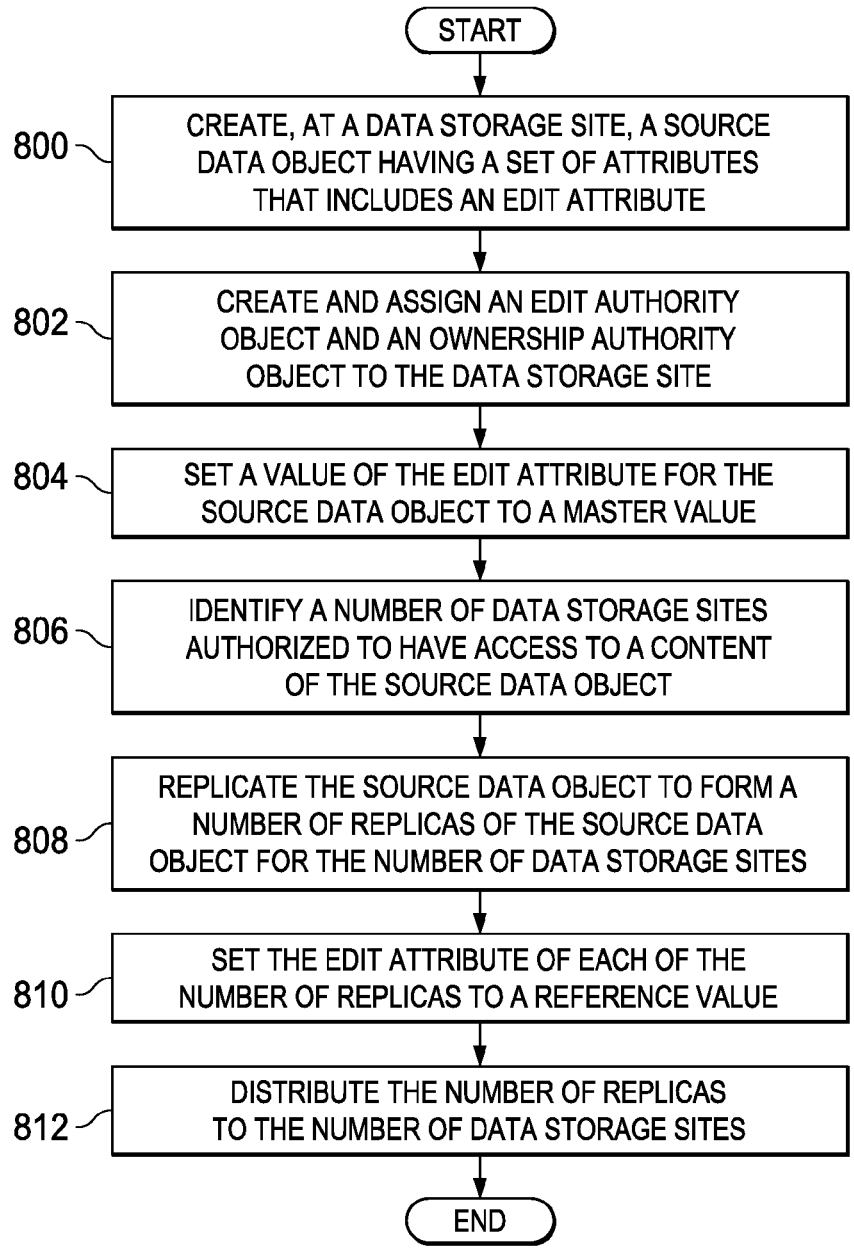
FIG. 8 is an illustration of a process for creating a replication set in the form of a flowchart in accordance with an illustrative embodiment.

With reference now to FIG. 8, an illustration of a process for creating a replication set is depicted in the form of a flowchart in accordance with an illustrative embodiment. The process illustrated in FIG. 8 may be used to create a replication set, such as, for example, without limitation, replication set 104 in FIG. 1.

The process may begin by creating, at a data storage site, a source data object having a set of attributes that includes an edit attribute (operation 800). Next, an edit authority object and an ownership authority object are created and assigned to the data storage site (operation 802). Then, a value of the edit attribute for the source data object is set to a master value (operation 804).

Thereafter, a number of data storage sites authorized to have access to a content of the source data object is identified (operation 806). The source data object is replicated to form a number of replicas of the source data object for the number of data storage sites (operation 808). Each of the number of replicas formed in operation 808 shares a same content as the source data object.

The edit attribute of each of the number of replicas is set to a reference value (operation 810). The number of replicas is distributed to the number of data storage sites (operation 812), with the process terminating thereafter.

Figure 9:
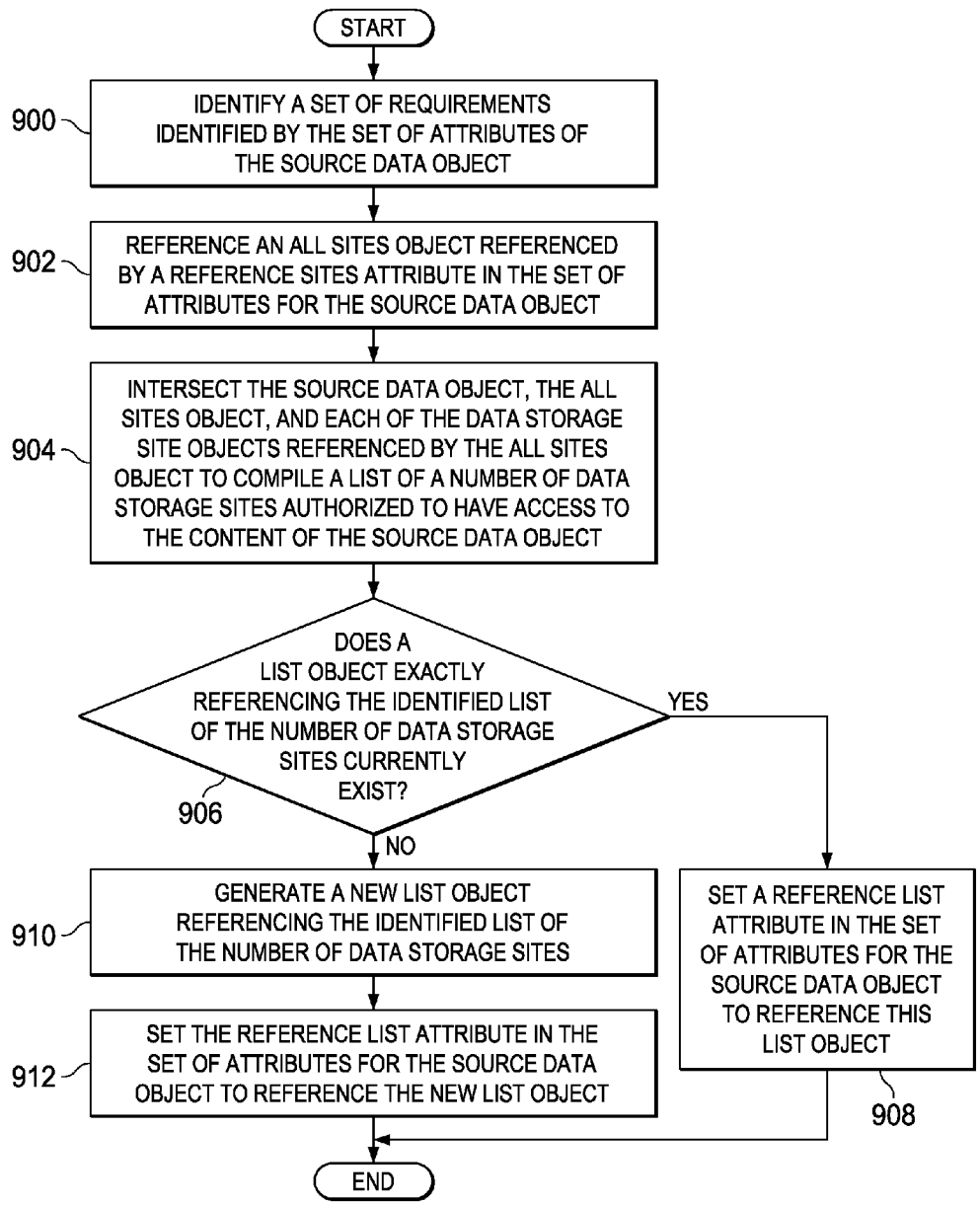
FIG. 9 is an illustration of a process for identifying a number of data storage sites authorized to have access to the content of a source data object in the form of a flowchart in accordance with an illustrative embodiment.

With reference now to FIG. 9, an illustration of a process for identifying a number of data storage sites authorized to have access to the content of a source data object is depicted in the form of a flowchart in accordance with an illustrative embodiment. The process illustrated in FIG. 9 may be an example of one manner in which operation 806 in FIG. 8 may be performed.

The process may begin by identifying a set of requirements identified by the set of attributes of the source data object (operation 900). In operation 900, the set of attributes may include any number of attributes that identify requirements to be met by the data storage sites that will be authorized to have access to the content of the source data object. The set of requirements may include, for example, without limitation, a set of export license requirements, a set of security requirements, a set of intellectual property requirements, a set of some other type of requirements, or some combination thereof.

Next, an all sites object referenced by a reference sites attribute in the set of attributes for the source data object is referenced (operation 902). In operation 902, the all sites object is an object that may identify all of the data storage sites available in a network. Further, the all sites object may reference the data storage site object corresponding to each of these data storage sites.

Next, the source data object, the all sites object, and each of the data storage site objects referenced by the all sites object are intersected to compile a list of a number of data storage sites authorized to have access to the content of the source data object (operation 904). A determination is made as to whether a list object exactly referencing the identified list of the number of data storage sites currently exists (operation 906).

If this list object currently exists, a reference list attribute in the set of attributes for the source data object is set to reference this list object (operation 908), with the process terminating thereafter. Otherwise, if the list object does not currently exist, a new list object referencing the identified list of the number of data storage sites is generated (operation 910). The reference list attribute in the set of attributes for the source data object is then set to reference the new list object (operation 912), with the process terminating thereafter.

Figure 10:
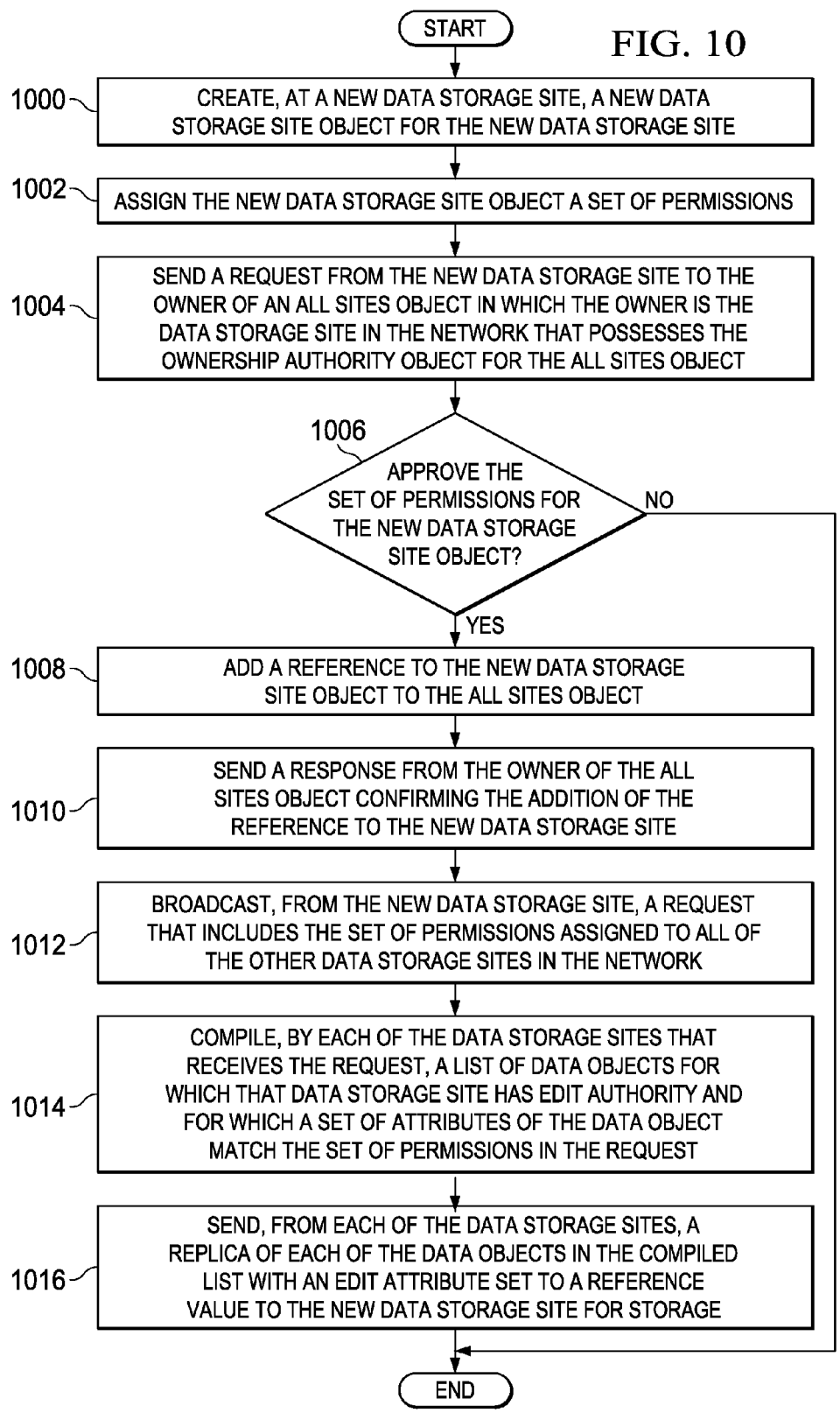
FIG. 10 is an illustration of a process for adding a new data storage site to a network in the form of a flowchart in accordance with an illustrative embodiment.

With reference now to FIG. 10, an illustration of a process for adding a new data storage site to a network is depicted in the form of a flowchart in accordance with an illustrative embodiment. The process illustrated in FIG. 10 may be used to add a new data storage site to a network, such as network 103 in FIG. 1.

The process begins by creating, at a new data storage site, a new data storage site object for the new data storage site (operation 1000). The new data storage site may be one that has been recently added to the network. The new data storage site object is assigned a set of permissions (operation 1002). The set of permissions in operation 1002 may include, for example, without limitation, export license permissions, intellectual property license permissions, security permissions, some other type of permissions, or some combination thereof.

Next, the new data storage site sends a request to the owner of an all sites object in which the owner is the data storage site in the network that possesses the ownership authority object for the all sites object (operation 1004). The request includes the set of permissions assigned for the new data storage site object.

The owner of the all sites object makes a determination as to whether to approve the set of permissions for the new data storage site object (operation 1006). If the owner of the all sites object does not approve the set of permissions, the process terminates and a reference to the new data storage site object is not added to the all sites object.

Otherwise, if the owner of the all sites object does approve the set of permissions, a reference to the new data storage site object is added to the all sites object (operation 1008). Next, the owner of the all sites object sends a response confirming the addition of the reference to the new data storage site (operation 1010).

The new data storage site then broadcasts a request that includes the set of permissions assigned to all of the other data storage sites in the network (operation 1012). Thereafter, each of the data storage sites that receives the request compiles a list of data objects for which that data storage site has edit authority and for which a set of attributes of the data object match the set of permissions in the request (operation 1014). Each of the data storage sites then sends a replica of each of the data objects in the compiled list with an edit attribute set to a reference value to the new data storage site for storage (operation 1016), with the process terminating thereafter.

Figure 11:
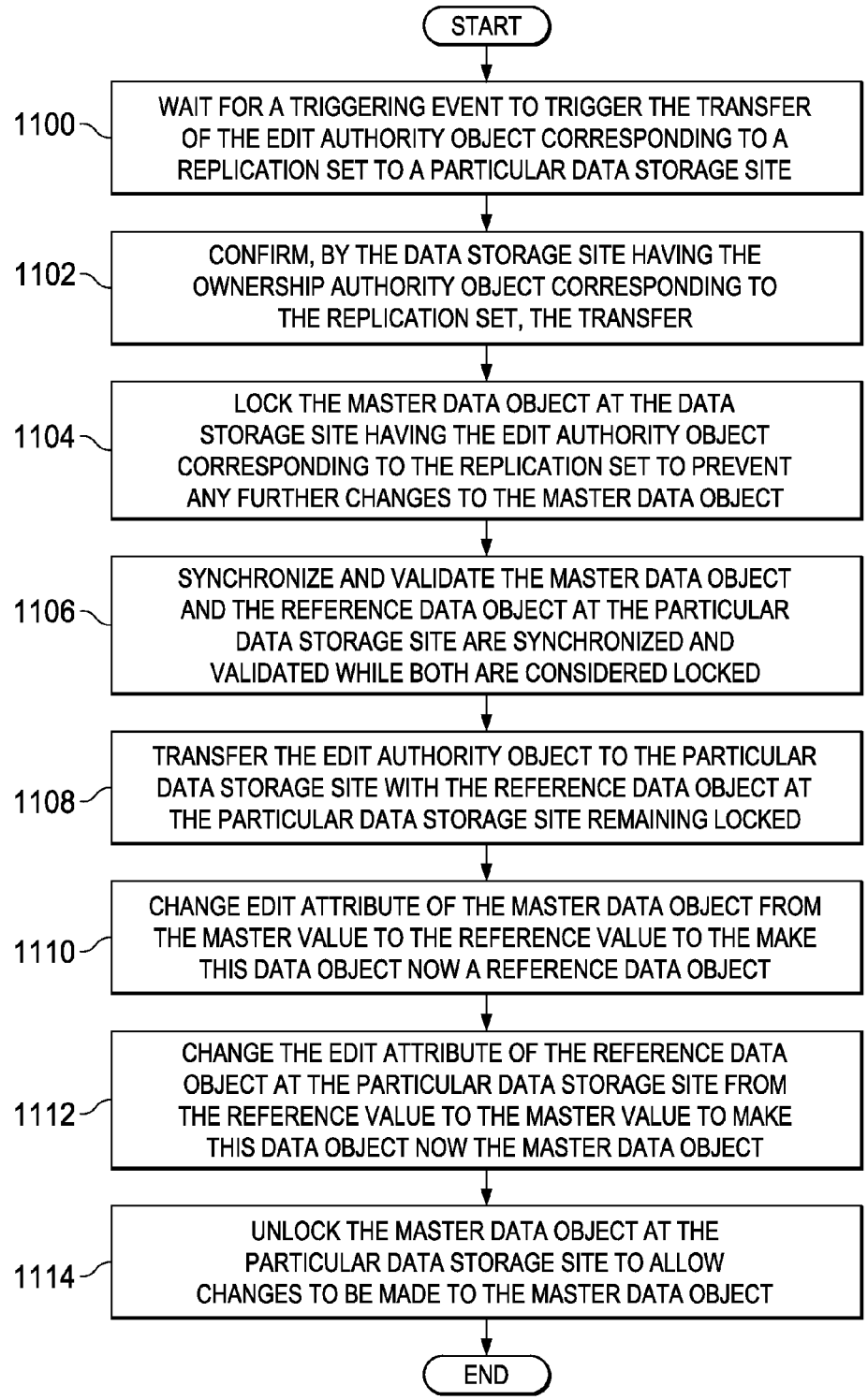
FIG. 11 is an illustration of a process for transferring an edit authority object in the form of a flowchart in accordance with an illustrative embodiment.

With reference now to FIG. 11, an illustration of a process for transferring an edit authority object is depicted in the form of a flowchart in accordance with an illustrative embodiment. The process illustrated in FIG. 11 may be used to transfer an edit authority object, such as edit authority object 112 in FIG. 1, from one data storage site in a network to another data storage site in a network.

The process begins by waiting for a triggering event to trigger the transfer of the edit authority object corresponding to a replication set to a particular data storage site (operation 1100). The triggering event may be, for example, receiving a request for the transfer from the particular data storage site. In response to the triggering event occurring, the data storage site having the ownership authority object corresponding to the replication set confirms the transfer (operation 1102).

The master data object at the data storage site having the edit authority object corresponding to the replication set is locked to prevent any further changes to the master data object (operation 1104). The reference data object at the particular data storage site may already be unavailable for editing and thus considered locked. The master data object and the reference data object at the particular data storage site are synchronized and validated while both are considered locked (operation 1106).

Next, the edit authority object is transferred to the particular data storage site with the reference data object at the particular data storage site remaining locked (operation 1108). The edit attribute of the master data object is changed from the master value to the reference value to the make this data object now a reference data object (operation 1110). The edit attribute of the reference data object at the particular data storage site is changed from the reference value to the master value to make this data object now the master data object (operation 1112).

The master data object at the particular data storage site is unlocked to allow changes to be made to the master data object (operation 1114), with the process terminating thereafter. Although the process described in FIG. 11 is for the transfer of an edit authority object, a similar process may be used to transfer an ownership authority object or some type of other authority object.

Figure 12:
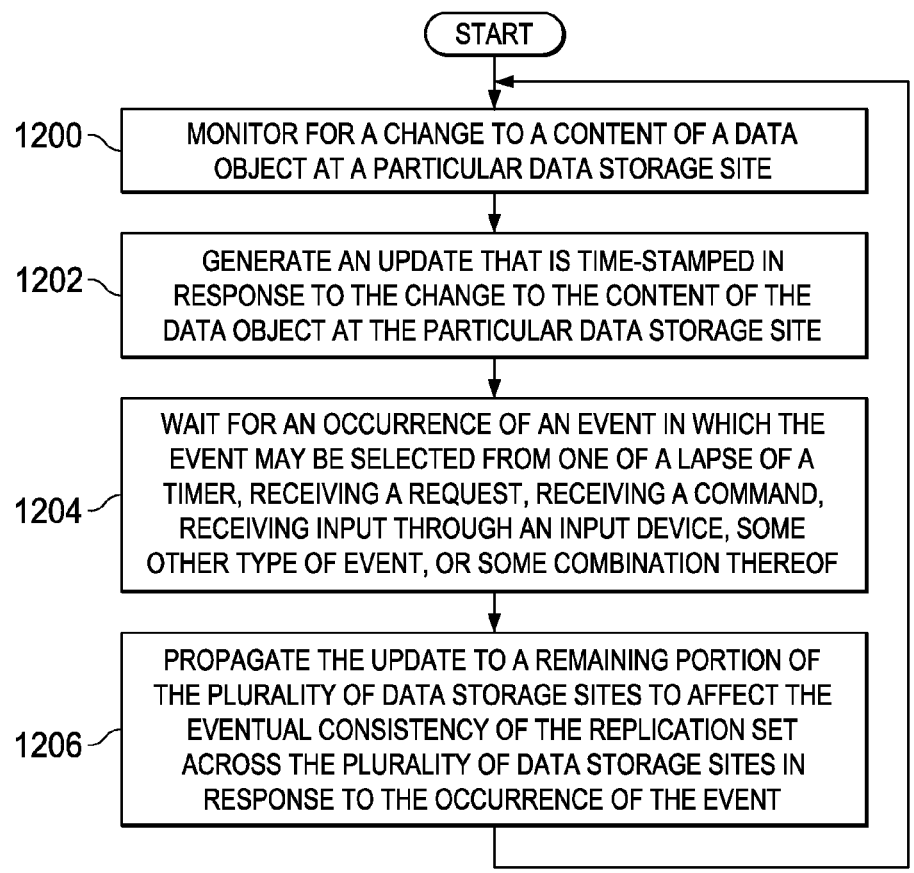
FIG. 12 is an illustration of a process for maintaining eventual consistency of a replication set across a plurality of data storage sites in the form of a flowchart in accordance with an illustrative embodiment.

With reference now to FIG. 12, an illustration of a process for maintaining eventual consistency of a replication set across a plurality of data storage sites is depicted in the form of a flowchart in accordance with an illustrative embodiment. This process may be used to maintain eventual consistency of a replication set, such as replication set 104 in FIG. 1.

The process begins by monitoring for a change to a content of a data object at a particular data storage site (operation 1200). In response to the change to the content of the data object, an update that is time-stamped is generated (operation 1202).

The process then waits for an occurrence of an event in which the event may be selected from one of a lapse of a timer, receiving a request, receiving a command, receiving input through an input device, some other type of event, or some combination thereof (operation 1204). The update is propagated to a remaining portion of the plurality of data storage sites to affect the eventual consistency of the replication set across the plurality of data storage sites in response to the occurrence of the event (operation 1206), with the process then returning to operation 1200 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 13:
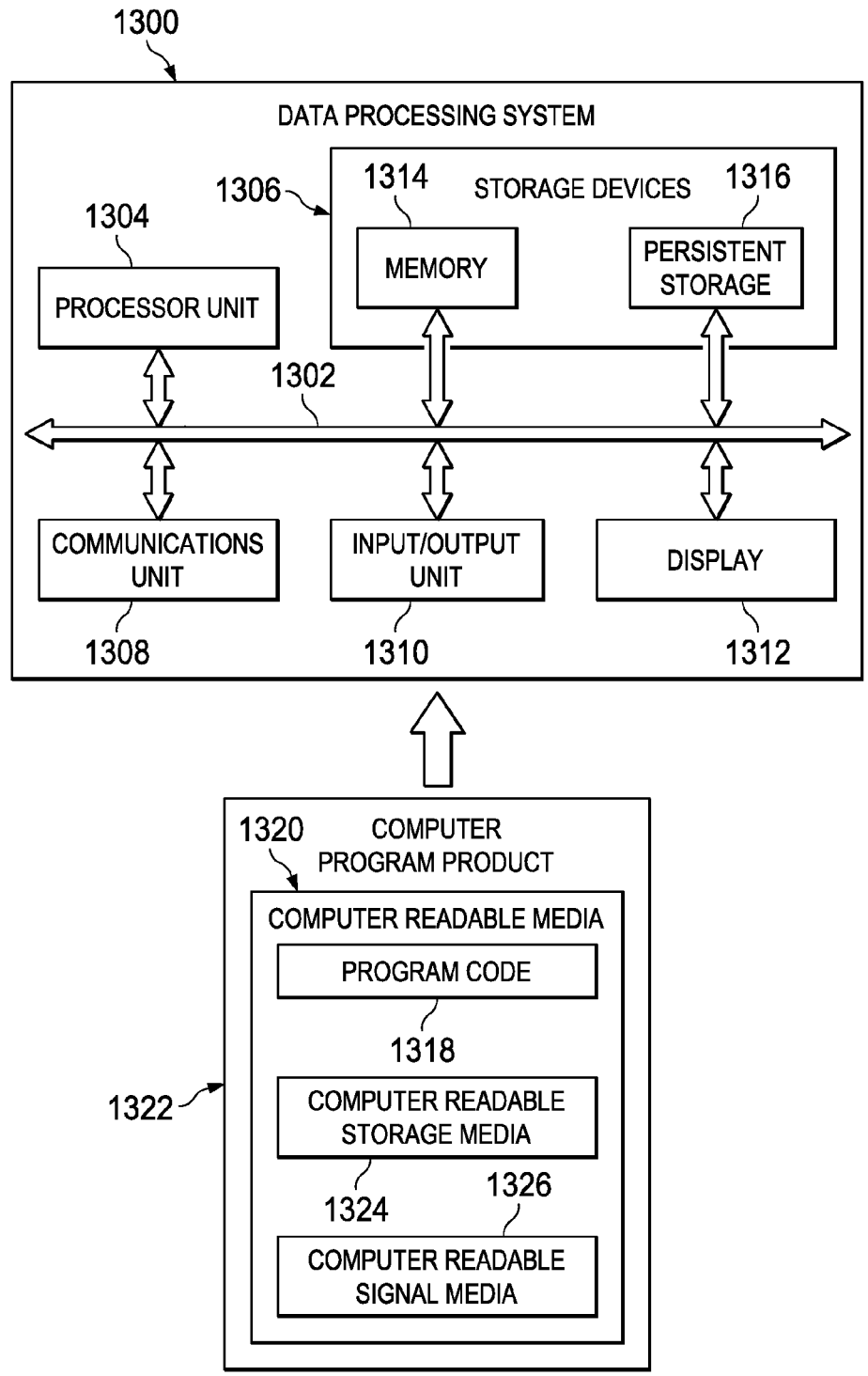
FIG. 13 is an illustration of a data processing system in the form of a block diagram in accordance with an illustrative embodiment.

Turning now to FIG. 13, an illustration of a data processing system in the form of a block diagram is depicted in accordance with an illustrative embodiment. Data processing system 1300 may be used to implement, for example, one or more of plurality of data storage sites 102 in FIG. 1. As depicted, data processing system 1300 includes communications framework 1302, which provides communications between processor unit 1304, storage devices 1306, communications unit 1308, input/output unit 1310, and display 1312. In some cases, communications framework 1302 may be implemented as a bus system.

Processor unit 1304 is configured to execute instructions for software to perform a number of operations. Processor unit 1304 may comprise at least one of a number of processors, a multi-processor core, or some other type of processor, depending on the implementation. In some cases, processor unit 1304 may take the form of a hardware unit, such as a circuit system, an application specific integrated circuit (ASIC), a programmable logic device, or some other suitable type of hardware unit.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Instructions for the operating system, applications and programs run by processor unit 1304 may be located in storage devices 1306. Storage devices 1306 may be in communication with processor unit 1304 through communications framework 1302. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1314 and persistent storage 1316 are examples of storage devices 1306. Memory 1314 may take the form of, for example, a random access memory or some type of volatile or non-volatile storage device. Persistent storage 1316 may comprise any number of components or devices. For example, persistent storage 1316 may comprise a hard drive, a flash memory, a rewritable optical disk, a rewritable magnetic tape, or some combination of the above. The media used by persistent storage 1316 may or may not be removable.

Communications unit 1308 allows data processing system 1300 to communicate with other data processing systems, devices, or both. Communications unit 1308 may provide communications using physical communications links, wireless communications links, or both.

Input/output unit 1310 allows input to be received from and output to be sent to other devices connected to data processing system 1300. For example, input/output unit 1310 may allow user input to be received through a keyboard, a mouse, some other type of input device, or a combination thereof. As another example, input/output unit 1310 may allow output to be sent to a printer connected to data processing system 1300.

Display 1312 is configured to display information to a user. Display 1312 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1304 using computer-implemented instructions. These instructions may be referred to as program code, computer usable program code, or computer readable program code and may be read and executed by one or more processors in processor unit 1304.

In these examples, program code 1318 is located in a functional form on computer readable media 1320, which is selectively removable, and may be loaded onto or transferred to data processing system 1300 for execution by processor unit 1304. Program code 1318 and computer readable media 1320 together form computer program product 1322. In this illustrative example, computer readable media 1320 may be computer readable storage media 1324 or computer readable signal media 1326.

Computer readable storage media 1324 is a physical or tangible storage device used to store program code 1318 rather than a medium that propagates or transmits program code 1318. Computer readable storage media 1324 may be, for example, without limitation, an optical or magnetic disk or a persistent storage device that is connected to data processing system 1300.

Alternatively, program code 1318 may be transferred to data processing system 1300 using computer readable signal media 1326. Computer readable signal media 1326 may be, for example, a propagated data signal containing program code 1318. This data signal may be an electromagnetic signal, an optical signal, or some other type of signal that can be transmitted over physical communications links, wireless communications links, or both.

The illustration of data processing system 1300 in FIG. 13 is not meant to provide architectural limitations to the manner in which the illustrative embodiments may be implemented. The different illustrative embodiments may be implemented in a data processing system that includes components in addition to or in place of those illustrated for data processing system 1300. Further, components shown in FIG. 13 may be varied from the illustrative examples shown.

Thus, the illustrative embodiments described above provide a method and apparatus for managing data objects and maintaining data consistency. The master data object stored at the data storage site where an edit authority object corresponding to the replication set to which the master data object belongs is the only data object that can be modified or changed. However, the edit authority object may be transferred to a different data storage site to allow the data object at that data storage site to be modified.

Data objects may only be distributed to data storage sites that meet a set of requirements. Data consistency may be maintained on an eventually consistent basis to reduce the overall amount of time and expense associated with maintaining data consistency.

This type of system methodology may be better suited for globally distributed data management and development. Individual data storage sites may have the ability to control and change their respective data objects without a single data storage site controlling authority for the entire process. In this manner, performance and agility in maintaining data consistency across data storage sites that may or may not be in close geographical proximity may be improved. A distributed design also allows "disconnected" data development in cases where network infrastructure may be limited.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for distributing authority to manage data objects, the apparatus comprising:
   a replication set comprising a plurality of data objects, wherein each of the plurality of data objects comprises a copy of a content;
   a plurality of data storage sites, wherein the each of the plurality of data objects is stored at a different one of the plurality of data storage sites; and
   an edit authority object corresponding to the replication set that assigns an edit authority to only one of the plurality of data storage sites at a time and that is transferable between the plurality of data storage sites;
   an ownership authority object corresponding to the replication set, wherein the ownership authority object assigns an ownership authority to only one of the plurality of data storage sites at a time and that is transferable between the plurality of data storage sites, and wherein the ownership authority allows a corresponding data storage site in the plurality of data storage sites at which the ownership authority object is located to designate which of the plurality of data storage sites gets assigned the edit authority;
   wherein a change to the content of a particular data object of the plurality of data objects at a particular data storage site in the plurality of data storage sites having the edit authority is propagated as an update to a remaining portion of the plurality of data storage sites to affect eventual consistency of the replication set across the plurality of data storage sites; and
   wherein a remaining portion of the plurality of data objects at the remaining portion of plurality of data storage sites is usable until the update is received and processed, to thereby reduce a time and an expense associated with maintaining consistency across the replication set.

2. The apparatus of claim 1, wherein the edit authority is transferable between the plurality of data storage sites independently of the ownership authority object.

3. The apparatus of claim 1, wherein each data object in the plurality of data objects comprises:
   an attribute having a value selected from one of a master value and a reference value, wherein only one of the plurality of data objects has the attribute with the master value.

4. The apparatus of claim 3, wherein the value of the attribute of the particular data object is changed from the master value to the reference value and the value of the attribute of a different data object at a different data storage site in the plurality of data storage sites is changed from the reference value to the master value in correspondence with the edit authority object being transferred from the particular data storage site to the different data storage site.

5. The apparatus of claim 1, wherein the plurality of data storage sites belongs to a network and wherein the plurality of data storage sites communicate with each other using communications links.

6. The apparatus of claim 1, wherein the replication set is a dynamic replication set that allows a data object to be at least one of added to the replication set or removed from the replication set.

7. The apparatus of claim 1, wherein the plurality of data objects in the replication set includes a source data object and a number of replicas of the source data object.

8. A distributed data authority system for storing data objects and distributing authority for managing the data objects comprising:
   a plurality of data storage sites in a network;
   a replication set comprising a plurality of data objects stored at the plurality of data storage sites, wherein each of the plurality of data objects comprises a copy of a content; and
   an edit authority object corresponding to the replication set that assigns an edit authority to only one of the plurality of data storage sites at a time and that is transferable between the plurality of data storage sites; and
   an ownership authority object corresponding to the replication set, wherein the ownership authority object assigns an ownership authority to only one of the plurality of data storage sites at a time and is transferable between the plurality of data storage sites, and wherein the ownership authority allows a corresponding data storage site in the plurality of data storage sites at which the ownership authority object is located to designate which of the plurality of data storage sites gets assigned the edit authority;

wherein a change to the content of a particular data object of the plurality of data objects at a particular data storage site in the plurality of data storage sites having the edit authority is propagated as an update to a remaining portion of the plurality of data storage sites to affect eventual consistency of the replication set across the plurality of data storage sites; and wherein a remaining portion of the plurality of data objects at the remaining portion of the plurality of data storage sites remains usable until the update is received and processed to reduce a time and an expense associated with maintaining consistency across the replication set.

9. A method for distributing authority to manage data objects, the method comprising:

storing each of a plurality of data objects in a replication set at a different one of a plurality of data storage sites, wherein the each of the plurality of data objects comprises a copy of a content;

assigning an edit authority to only one of the plurality of data storage sites at a time using an edit authority object corresponding to the replication set, wherein the edit authority object is transferable between the plurality of data storage sites;

propagating an update to a remaining portion of the plurality of data storage sites to affect eventual consistency of the replication set across the plurality of data storage sites in response to a change to the content of a particular data object of the plurality of data objects located at a particular data storage site having the edit authority object;

assigning an ownership authority to the particular data storage site in the plurality of data storage sites by storing an ownership authority object corresponding to the replication set at the particular data storage site, wherein the ownership authority allows the particular data storage site to designate which of the plurality of data storage sites gets assigned the edit authority and wherein the ownership authority object is transferable between the plurality of data storage sites; and maintaining usability of a remaining portion of the plurality of data objects at the remaining portion of the plurality of data storage sites until the update is received and processed to thereby reduce a time and an expense associated with maintaining consistency across the replication set.

10. The method of claim 9, wherein propagating the update comprises:

generating the update in response to the change to the content of the particular data object, wherein the update is time-stamped;

waiting for an occurrence of an event, wherein the event is selected from one of a lapse of a timer, receiving a request, receiving a command, or receiving input through an input device; and propagating the update to the remaining portion of the plurality of data storage sites to affect the eventual consistency of the replication set across the plurality of data storage sites in response to the occurrence of the event.

11. The method of claim 9 further comprising:

creating a source data object having the content at the particular data storage site;

replicating the source data object to form a number of replicas of the source data object, wherein the source data object and the number of replicas form the plurality of data objects in the replication set; and storing the number of replicas at a number of data storage sites in the plurality of data storage sites.

12. The method of claim 11 further comprising:

setting a value of an attribute of the source data object to a master value and of each of the number of replicas to a reference value.

13. The method of claim 12 further comprising:

transferring the edit authority object from the particular data storage site to a different data storage site in the plurality of data storage sites;

changing the master value of the attribute of the source data object to the reference value in correspondence with transferring the edit authority object; and changing the reference value of the attribute of a replica in the number of replicas at the different data storage site to the master value in correspondence with transferring the edit authority object.

14. The method of claim 11 further comprising:

generating a list object that identifies a list of the number of data storage sites authorized to have access to the content of a data object in the plurality of data objects based on a set of attributes of the data object.

15. The method of claim 9 further comprising:

transferring the ownership authority object from the particular data storage site to a different data storage site in the plurality of data storage sites.

16. The method of claim 9 further comprising:

limiting access to a data object in the plurality of data objects by the plurality of data storage sites based on a set of requirements, wherein the set of requirements includes at least one of a set of export license requirements, a set of intellectual property license requirements, or a set of security requirements.

* * * * *